United States Patent

[11] 3,630,002

[72] Inventor Bill S. Burrus
Tulsa, Okla.
[21] Appl. No. 22,224
[22] Filed Mar. 24, 1970
[45] Patented Dec. 28, 1971
[73] Assignee Combustion Engineering, Inc.
New York, N.Y.

[54] SEPARATOR CONTROL SYSTEM
5 Claims, 1 Drawing Fig.
[52] U.S. Cl. .................................................. 55/164
[51] Int. Cl. ....................................................... B01d 19/00
[50] Field of Search ........................................... 55/21, 164, 168, 174, 431

[56] References Cited
UNITED STATES PATENTS

| 2,664,170 | 12/1952 | Walker et al. | 55/168 |
| 2,767,802 | 10/1956 | Orrell | 55/174 X |
| 2,997,053 | 8/1961 | Walker et al. | 55/168 X |
| 3,021,709 | 2/1962 | Walker et al. | 55/21 X |
| 3,073,091 | 1/1963 | Kalish | 55/21 |
| 3,135,113 | 6/1964 | Walker et al. | 55/42 X |

Primary Examiner—Reuben Friedman
Assistant Examiner—R. W. Burks
Attorney—Arthur L. Wade ABSTRACT: A separator receiving the output of a subsea well is connected to gas and liquid transmission conduits for delivery of the fluids for subsequent use or processing. The transmission conduits are controlled by valves responsive to pressures of the system and the force of springs.

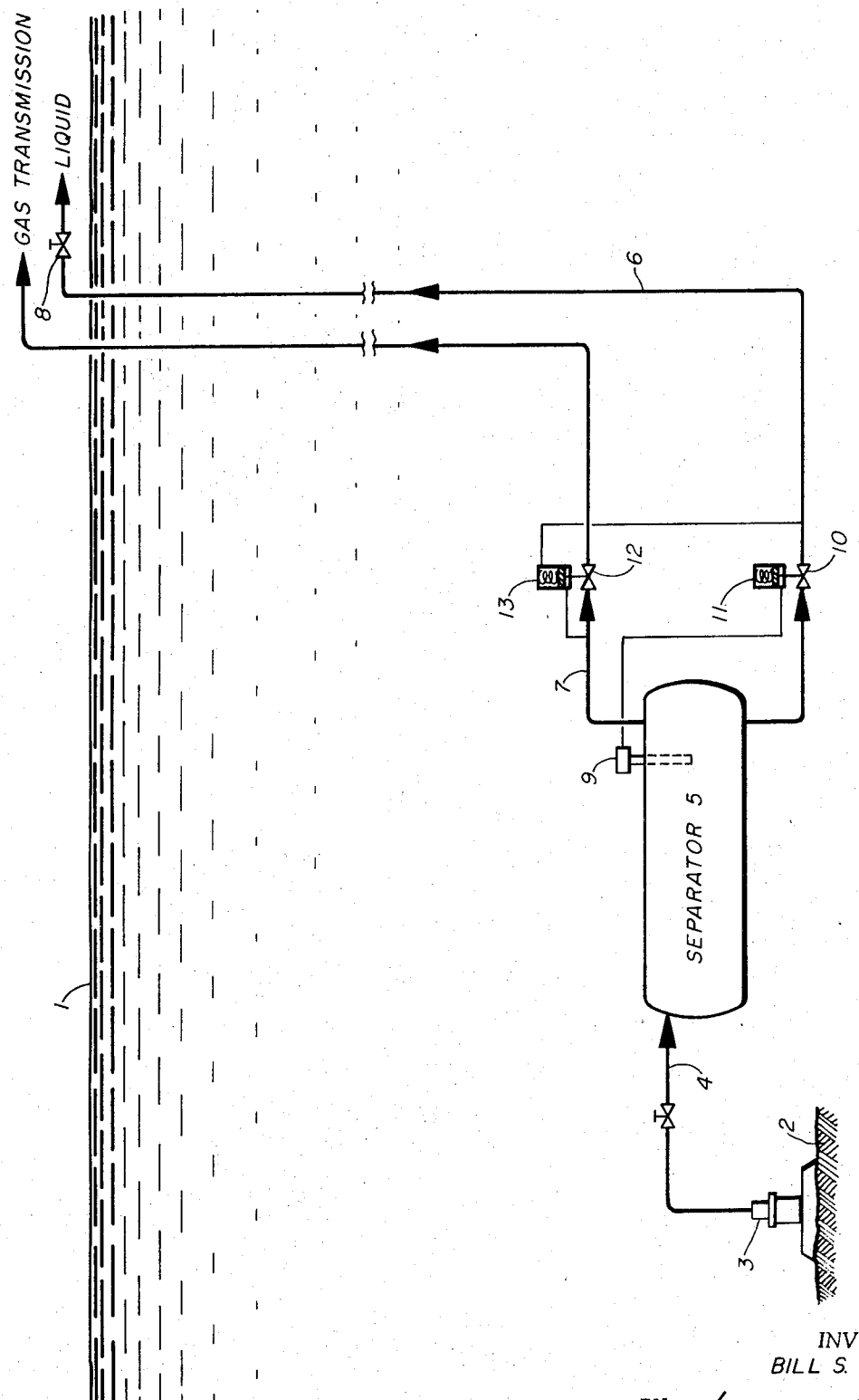

SEPARATOR CONTROL SYSTEM

BACKGROUND OF THE INVENTION

1. Field of the Invention

The present invention relates to the control of fluid flow from a high-pressure multiphase fluid separator by regulation of the discharge of the gaseous phase. More particularly, the invention relates to flowing the liquids from the separator to maintain a predetermined level in the separator while regulating the pressure at which gas is discharged with the separator pressure and the pressure at which the liquids are transmitted from the separator.

2. Description of the Prior Art

It has been the practice to produce oil well liquids and gas into a separator, sense the liquid level within the separator and control the gas flow out of the separator to maintain the pressure in the separator only high enough to "boost" the liquids out of the separator. U.S. Pat. Nos. 2,997,053 and 2,664,170 disclose a simple control system to perform this function. The system has been traditionally referred to as the "dual control" system.

The gas and liquid valves of dual control systems have been mechanically linked together so that as the liquid valve has opened, the gas valve has been moved toward closing to maintain minimum boosting pressure with the gas in the separator. Conversely, the closing liquid valve has caused the gas valve to open to maintain just enough pressure on the liquid to flow it from the vessel without placing excessive pressure on the well flowing into the separator.

Beneath the sea, mechanical linkage between valves is precluded by the corrosion and fouling of the harsh environment. In general, primary elements to detect variables and generate fluid pressures for controlled elements, such as valves, offer a satisfactory alternate to mechanical linkage. Not only the harsh subsea environment forces this choice, but the high pressure of such working vessels as separators dictates this arrangement.

Any primary element, responsive to the level of separator liquid and developing a fluid pressure representative of the level, can be placed in control of the pressure responsive liquid discharge valve. However, developing a signal for the desired operation of the gas valve at the same time would be a formidable complication.

In summation, the problem is the control of the liquid level of a high-pressure separator which may be located subsea by varying the liquid discharge rate while maintaining the separator pressure at some predetermined value higher than the liquid transmission pressure without mechanical linkage between the valves or a common signal to the valves from the sensed liquid level.

SUMMARY OF THE INVENTION

The invention contemplates controlling the discharge of gas from a separator so as to maintain the gas pressure in the separator a predetermined value above the pressure of the liquid transmission line from the separator. The liquid discharge is controlled by a valve responsive to liquid level in the separator and the gas discharge is controlled by a valve sensitive to a combination of separator pressure and liquid transmission line pressure and a spring force. The transmission line pressure is varied by regulation of its flow rate at a point downstream of the separator while the combination of pressure differentials and spring force controls the pressure at which the gas is discharged, only that pressure being thereby maintained in the separator which will force the liquid from the separator.

Other objects, advantages and features of this invention will become apparent to one skilled in the art upon consideration of the written specification, appended claims, and attached drawing, wherein;

The drawing is a schematic illustration of a subsea installation of a separator at a wellhead controlled with a system embodying the present invention.

DESCRIPTION OF THE PREFERRED EMBODIMENT

The Operating Situation

The separation of liquids and gases produced from an oil well is an ancient, fundamental process. It is conventional to provide a vessel at, and connected to, the wellhead in which the fluids can separate. Separate output conduits connected to the vessel flow the separated fluids from the process of separation.

Several pressure conditions must be controlled in this process of separation. The well may deliver its fluids at a very high pressure in the order of thousands of pounds per square inch. A valve may be used to adjust this flow of liquids into the separator vessel. Valves in the output conduits regulate the pressure at which fluids are delivered from the separator pressure. Therefore, there is a well pressure, a vessel pressure and conduit pressures to consider and control in "operating" the separation process. In many ways, this operation is complex.

In the past, a valve at the wellhead has established the flow rate from the well into the separator. Such valve has been readily accessible for adjustment. The liquid level within the separator has been sensed with a float which is mechanically linked to the valves in the output conduits. The float has been readily linked to simultaneously control both the gas and liquid valves to adjust the gas valve so the separator pressure has been maintained just high enough to boost the liquid down the transmission line to subsequent processing. All of this system had to be changed in contemplation of separators plunging beneath the surface of the sea to receive the production of subsea wellheads.

Under high pressures and/or subsea conditions, the level cannot be sensed with a simple float linked to external linkage with the valves. Either the high pressure and/or the harsh environment of the sea prevents this simple arrangement. A further analysis of the forces of the system was required to develop a system which would be as reliable as the old system yet be positive and certain in providing the force required to move the liquids while placing a minimum of pressure on the well formation.

The present invention was conceived after accepting the basic regulation of total separator throughput from a remote, downstream position readily accessible from the surface. The transmission line for the liquid would have the basic regulating valve at, or near, the surface and the transmission line for the liquid and the separator would be built to contain the maximum pressure of the well. This is a far cry from the old regulation of a wellhead valve setting the production rate into the separator, the separator and transmission line having to contain only the pressure downstream of the wellhead valve.

Next, the level of separator liquids was sensed by some device other than a simple float. Many level detectors can be developed for this subsea service. At present, a radiation level device providing this function is disclosed in U.S. Pat. application Ser. No. 789,179, filed Jan. 6, 1969 by Bill S. Burrus et al. Whatever the nature of the signal generated in response to level, it is desirable that it be transduced into a fluid pressure which is readily applied to the output liquid valve in the transmission line. However, it is cumbersome and clumsy to also modify this signal to simultaneously adjust the gas valve in the manner desired.

It was at this point in the analysis of the problem that the present invention was conceived. As it was fundamentally desired that the separator pressure float above the transmission line pressure, the gas valve could be controlled by the difference of these two pressures, biased by a constant force. All three forces could be simultaneously applied to a pressure-responsive operator for the gas valve. Thus, while the level control adjusted the output liquid valve to maintain the separator liquid level within predetermined limits, the gas valve would be controlled to discharge gas at a rate which would establish the separator pressure a predetermined amount more than the transmission line pressure downstream of the liquid discharge valve.

Structure-Function Relationships

In the drawings, a subsea environment has been depicted, the water being shown with a surface 1 over a bottom 2. A well has been drilled in the bottom 2 and its completion is evidenced by wellhead 3. Wellheads generally present a more complicated appearance than depicted here. However, the thrust of this disclosure is served by disclosing conduit 4 connected to flow well contents from the wellhead into separator 5 as a vessel.

To indicate the basic separation, liquid discharge conduit 6 and gaseous discharge conduit 7 are disclosed, extending from the vessel 5 to the surface 1. Thus is defined the simple flow path for the produced fluids from the subsea well.

The basic control of the fluid flow begins with valve 8. The setting of valve 8 establishes the rate of liquids from wellhead 3 which are produced to subsequent processing. If the well is "shut in," all flow interrupted, the full pressure of the well is reached throughout conduit 4, separator 5 and transmission conduit 6. Obviously, of major consideration is the strength of these structures subjected to this great internal pressure.

When valve 8 is opened, the rate of liquid flow established, the present invention functions to maintain a desired range of levels in separator 5 and a desired pressure in separator 5 which will insure that liquids flow along transmission conduit 6 to their subsequent processing.

The level of liquids in separator 5 is disclosed as sensed, or detected, by a nuclear device 9. This particular disclosure is of a unit which has been developed and made the subject of U.S. patent application mentioned supra. Any level detector which can function in this subsea environment will serve this purpose. A fluid pressure, representative of the liquid level, is generated, which signal can be used to control valve 10.

Valve 10 is placed in transmission conduit 6 to modify the demand established by valve 8 in order to maintain the level of separator 5 within predetermined limits. As shown in the drawing, a piston operator 11 essentially comprises a housing in which a piston is provided and connected to the stem of valve 10. A spring is imposed on one side of the piston and the fluid pressure signal of detector 9 is placed on the opposite side of the piston. The spring tends to move the valve in one direction and the fluid pressure is directed to overcoming the spring force and moving the valve in the opposite direction. It is to be understood that other forms of pressure actuated valve operators could be employed and the present piston type is only illustrative of all such forms.

The setting of valve 8 establishes the pressure in transmission conduit 6. If valve 8 is opened from a position, the pressure in conduit 6 will fall. At the same time, valve 10 will be adjusted by level detector 9 to maintain the liquid level in separator 5. Therefore, the pressure in separator 5 will vary as valve 10 is adjusted to establish the differential pressure drop required to flow liquids from separator 5 to maintain the desired level of liquid in the separator.

The essential elements of the invention then come into play. The gas separated from the liquid is discharged through conduit 7 as determined by the setting of valve 12. It is an object of the invention to adjust valve 12 so sufficient additional separator pressure will be generated to boost the liquids across valve 10 but to preclude the separator pressure rising so high that unnecessary and harmful back pressure will be carried on the producing formation of the well. To do this job of adjustment, another fluid pressure operator, operator 13, is mounted on valve 12 and their forces applied to it.

Fundamentally, the separator pressure and liquid transmission pressure are opposed on the operator. Then the constant force of a spring is placed on the operator. The spring force is directed to closing valve 12 which will tend to build up separator pressure by decreasing the gas discharged. The transmission pressure is added to the spring force. Any decrease in transmission pressure will also call for decreased separator pressure, but it will be maintained great enough to force the liquid out. The separator pressure is placed in opposition to the transmission force to establish an upper limit to separator pressure and, therefore, a limit on the pressure exerted on the producing well. When these three forces are balanced, the result is a separator pressure a predetermined amount higher than the transmission pressure to insure the transfer of liquids but, hopefully, not high enough to prevent the well from producing.

From the foregoing it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

The invention having been described, what is claimed is:

1. Control system for a two-phase subsea separator, including,
   an input line connected to the subsea separator for introducing a two-phase stream of fluids into the separator,
   an output gas line connected to the separator,
   an output liquid line connected to the separator,
   a valve in the liquid line to control the flow of liquids from the separator,
   means arranged to detect liquid level in the separator and control the valve in the liquid line to maintain a predetermined range of level in the separator,
   a valve in the gas line,
   means sensing the separator pressure and liquid line pressure downstream of the liquid valve to control the valve in the gas line,
   whereby the gas pressure in the separator is maintained a predetermined amount greater than the downstream liquid line pressure while the separator liquid level is maintained within predetermined range.

2. The control system of claim 1, wherein the valves are responsive to pressure and the means detecting liquid level in the separator, separator pressure and liquid line pressure generate pressures for control of the valves.

3. The control system of claim 2, wherein the valve in the gas line is controlled by a pressure generated by the means sensing the separator pressure and the liquid line pressure as a differential of these two pressures and a spring force.

4. Control system for a subsea oil and gas separator, including,
   an oil and gas separator vessel positioned at a subsea location to receive the fluids produced from an oil well,
   an input conduit connected between the oil well and separator vessel with which produced fluids are introduced into the separator vessel,
   a first output conduit connected to the separator vessel to remove liquids to processing equipment located at the surface,
   a first valve in the first conduit to control the flow rate of the liquids transmitted from the separator,
   a second valve in the first conduit controlled to maintain a level of liquid in the separator,
   means connected to the separator to sense the level of liquid in the separator and control the second valve to maintain liquid level,
   a second output conduit connected to the separator vessel to remove gas for disposal,
   a third valve in the second conduit to control the rate of gas removal and therefore the pressure of the separator,
   and a pressure-actuated operator for the third valve connected to respond to the combination of separator pressure and transmission pressure for the liquid and a spring force, which combination regulates the third valve to maintain separator pressure higher than the transmission pressure for the liquids.

5. The control system of claim 4, wherein the pressure-actuated operator for the third valve is a piston type of operator with a spring arranged to impose its force on the piston.

* * * * *